(12) United States Patent
Li et al.

(10) Patent No.: US 12,277,472 B2
(45) Date of Patent: Apr. 15, 2025

(54) RFID TAG QUANTITY ESTIMATION SYSTEM, RFID TAG QUANTITY ESTIMATION METHOD

(71) Applicant: SOOCHOW UNIVERSITY, Suzhou (CN)

(72) Inventors: Zhe Li, Suzhou (CN); Wei Deng, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 21 days.

(21) Appl. No.: 18/543,631

(22) Filed: Dec. 18, 2023

(65) Prior Publication Data

US 2024/0135121 A1 Apr. 25, 2024

Related U.S. Application Data

(63) Continuation-in-part of application No. 17/437,590, filed as application No. PCT/CN2021/079839 on Mar. 9, 2021, now abandoned.

(30) Foreign Application Priority Data

Apr. 27, 2020 (CN) .......................... 202010342199.1

(51) Int. Cl.
  *G06K 7/10* (2006.01)
  *H04B 7/02* (2018.01)
  *H04B 7/08* (2006.01)

(52) U.S. Cl.
  CPC ......... *G06K 7/10366* (2013.01); *H04B 7/028* (2013.01); *H04B 7/0831* (2013.01)

(58) Field of Classification Search
  CPC .............. G06F 18/213; G06K 19/0723; G06K 7/10069; G06K 7/10128; G06K 7/10366; H04B 7/028; H04B 7/0831
  See application file for complete search history.

(56) References Cited

U.S. PATENT DOCUMENTS

| | | | | |
|---|---|---|---|---|
| 8,843,315 | B1* | 9/2014 | Barbeau | G01C 21/30 701/1 |
| 2008/0180222 | A1* | 7/2008 | Hollister | H04L 67/12 340/10.3 |
| 2010/0039228 | A1* | 2/2010 | Sadr | G01S 5/12 340/10.1 |
| 2019/0325385 | A1* | 10/2019 | Tingler | G06K 19/0723 |

FOREIGN PATENT DOCUMENTS

| | | |
|---|---|---|
| CN | 103793670 A | 5/2014 |
| CN | 109886052 A | 6/2019 |
| CN | 111641438 A | 9/2020 |
| WO | 2018128603 A1 | 7/2018 |

* cited by examiner

*Primary Examiner* — Omer S Khan
(74) *Attorney, Agent, or Firm* — SZDC Law PC

(57) ABSTRACT

This application discloses a tag quantity estimation system and method of RFID. A processor-readable medium was disclosed at the same time. This estimation method applies a spatial diversity gain existing in a multi-antenna system. Separated and sequentially stacked the real parts and the imaginary parts of the multiple signals received by multiple antennas. Then, a tag quantity estimation problem is converted into a data clustering problem in high-dimensional space. In this way, the overlapped cluster data in low-dimensional space can be separated in the high-dimensional space, thereby improving the accuracy of tag quantity estimation.

7 Claims, 4 Drawing Sheets

RFID TAG QUANTITY ESTIMATION SYSTEM, RFID TAG QUANTITY ESTIMATION METHOD

This application is a Continuation-in-part Application of U.S. Ser. No. 17/437,590, filed on Sep. 9, 2021, which is the National Stage Application of PCT/CN2021/079839, filed on Mar. 9, 2021, which claims priority to Chinese Patent Application No. 202010342199.1, filed on Apr. 27, 2020, all of which are incorporated by reference for all purposes as if fully set forth herein.

TECHNICAL FIELD

This application relates to signal processing technologies, and specifically, to an ultra-high frequency RFID tag quantity estimation system based on high-dimensional space, an ultra-high frequency RFID tag quantity estimation method based on high-dimensional space.

JIANGE BACKGROUND

In recent years, RF identification technology has been successfully applied in many different fields such as warehouse inventory, asset tracking, and personal identification. In a typical multi-tag ultra-high frequency (UHF) RFID system, different passive tags can simultaneously reverse scatter their information. As a result, signals of the tags interfere with each other. This phenomenon, commonly known as tag collision, has a significant impact on the decreased access efficiency of the RFID system.

A common solution to this problem in various RFID standards such as ISO18000-6C is the Random Access Algorithm based on the framed slot (Framed Slot Aloha, FSA). Previous studies show that in RFID system based on FSA access protocol, the system can obtain the maximum throughput when the frame length is equal to the number of tags to be accessed. However, in an actual scenario, since the number of tags to be accessed is usually not known in advance, the RFID system based on the FSA access protocol rarely works in optimal state.

To solve this problem, existing work has proposed a series of algorithms for single-antenna RFID systems. For example, the slot state detection algorithm (SSDA) projects the received signal into the I-Q complex plane and estimates the quantity of signal clusters in the I-Q complex plane. Estimates of the quantity of tags are given based on the relationship between the quantity of clusters and the quantity of tags. Furthermore, there are also algorithms based on the statistical properties of the histogram (Histogram) to detect the existence of multiple tags and to determine the quantity of tags. Although these methods work well in a real-time system, their performance greatly deteriorates at a low signal-to-noise ratio (SNR). On the other hands, multi-antenna RFID systems have been widely used in recent years. A typical solution to estimating the quantity of tags under a multi-antenna system is to first perform the antenna selection (Antenna Selection, AS) algorithm to obtain higher signal-to-noise ratios, and then estimate the quantity of tags using the SSDA algorithm or Histogram algorithm. However, this scheme is sub-optimal because it employs only the information received by one antenna while discarding useful information on the other receiving antennas.

Therefore, a new ultra-high frequency RFID tag quantity estimation method is required.

SUMMARY

In view of the existing art defects, in a multi-antenna RFID environment, the objective of this application is to propose an ultra-high frequency RFID tag quantity estimation method based on high-dimensional space. In this estimation method, a spatial diversity gain existing in a multi-antenna system is used, and signals received by multiple antennas are re-arranged to high-dimensional vectors. So, a tag quantity estimation problem is modeled as a data clustering problem in high-dimensional space. In this way, overlapped cluster data in low-dimensional space can be separated in the high-dimensional space, thereby improving the accuracy of tag quantity estimation.

For the above purpose, the present application adopts the following technical solutions:

The embodiments of this application provide an RFID tag quantity estimation system, includes:
   a down-conversion module for down-converting RF signals received by the receiving antenna to the baseband;
   a carrier offset module for offsetting the carrier signal in the received signal which is sent by the transmitting antenna; and
   a tag quantity estimation module for estimating the quantity of tags, in this way, overlapped cluster data in low-dimensional space can be separated in the high-dimensional space, thereby improving the accuracy of tag quantity estimation.

The embodiments of this application provide an RFID tag quantity estimation system, includes:
   a down-conversion module for down-converting RF signals received by the receiving antenna to the baseband;
   a carrier cancellation module for remove carrier component in the received signal which is sent by the transmitting antenna;
   a noise normalization module for normalize the complex baseband signal with the carrier component removed;
   a tag signal preference module being preset with tag power threshold for selecting baseband signals that are greater than the label power threshold;
   a high-dimensional tensor generation module for the generate tensor dimension is greater than the quantity of input;
   a adaptive clustering discrimination module for calculating the quantity of high-dimensional clusters formed by the high-dimensional tensor;
   a temporary tag count module for recording the output of tags, and
   a tag quantity estimation module for estimating the quantity of tags. in this way, overlapped cluster data in low-dimensional space can be separated in the high-dimensional space, thereby improving the accuracy of tag quantity estimation.

The embodiments of this application provide an estimation method for an RFID tag quantity estimation system, includes:
   a transmitting antenna for transmitting RF signals;
   multiple receiving antennas for receiving RF tag signals;
   a down-conversion module for down-converting RF signals received by the receiving antennas to the baseband;
   a carrier cancellation module for remove carrier component in the received signal which is sent by the transmitting antenna; and a tag quantity estimation module for estimating the quantity of tags;
   where the method includes the following steps:
   S00: obtaining multiple information blocks of multiple tag signal responses as reference data for tag quantity estimation;
   S10: converting the received RF signals to baseband based on the down-conversion module;

S20: removing the carrier components based on a carrier cancellation module to obtain a digitized baseband signal and denoting the baseband signal by complex number;

S30: estimating the observed noise power in the complex baseband signal with the carrier component removed and normalize the estimate by the noise normalization module;

S40: put the normalized complex number baseband signals through tag signal preference module, the tag signal preference module being preset with a tag power threshold, selecting baseband signals that are greater than the label power threshold;

S50: put the selected complex baseband signals into high-dimensional tensor generation module, wherein its real part and imaginary part are taken for the complex baseband signals respectively, and the dimension of the tensor generated by the high-dimensional tensor generation module is two times the quantity of the input;

S60. calculating the quantity of high-dimensional clusters formed by the high-dimensional tensor based on adaptive clustering discrimination module;

S70: put the quantity of high-dimensional clusters obtained by the adaptive cluster resolution module into temporary tag count module and record the output of the tag count module as the result of the temporary tag count calculation;

S80: If the current tag power threshold reaches the maximum power of the tag, go to step S90, if not, the power threshold is adjusted upward and go to step S40;

S90: for the tag power threshold condition, all temporary tags quantity calculation results recorded in step S80 are passed through the tag quantity estimation module to obtain final tag quantity.

In an implementation, in the step S30 includes making normalize the noise power of each channel to 1, note that the maximum power of the tag in the resulting channel signal after normalization is $P_m$, and initialize the tag power threshold $P_t=1$.

In an implementation, in the step S80 includes: the tag power threshold is between $[1, P_m]$.

In an implementation, in the step S20: the digitized baseband signal comprises orthogonal and in-phase components, so it can be denoting by complex number.

In an implementation, for the step S50 The baseband signals of $N_s$ channels larger than the preset tag power threshold are selected and input into the tag quantity estimation module, and the tensor generated by the high-dimensional tensor generation module has a dimension of $2N_s$.

In an implementation, in the step S90: The final quantity of tag is obtained by the following formula:

$$N_t = \lceil \log_2 C \rceil,$$

wherein C is the quantity clusters after the classification.

In an implementation, in the step S80, the results of calculating the quantity of all temporary tags recorded are counted using a bar chart, and the quantity of tags whose frequency of occurrence is the highest is selected as the estimation result.

The embodiments of this application also provide a computer storage medium comprising a computer program that runs the above-described estimation method.

Compared with the solutions in the prior art, the advantages of this application are as follows:

In the RFID tag quantity estimation method provided in this application, the cluster data overlapping in low-dimensional space can be separated in the high-dimensional space, thereby improving the accuracy of tag quantity estimation. The implementation method has more obvious performance advantages when a quantity of antennas increases. In addition, when the quantity of antennas increases, the amount of calculation added is not large.

BRIEF DESCRIPTION OF DRAWINGS

To describe the technical solutions in the embodiments of this specification or the technical solution in the prior art more clearly, the following drawings briefly describe the embodiments or the technical solution in the prior art. Apparently, the drawings in the following description show merely some embodiments recorded in this specification, and a person of ordinary skill in the art may still derive other drawings from these drawings without paying creative efforts.

DETAILED DESCRIPTION OF EMBODIMENTS

The above solutions are further described below with reference to specific embodiments. It should be understood that these embodiments are used to illustrate this application and are not intended to limit the scope of this application. Implementation conditions used in the embodiments may be further adjusted according to conditions of specific manufacturers, and the unspecified implementation conditions are usually those conditions in routine experiments. To better illustrate the present disclosure, numerous specific details are provided in specific implementations below. Those skilled in the art should understand that the present disclosure may also be implemented without some specific details. In some examples, methods, means, elements, and circuits well-known to those skilled in the art are not described in detail to highlight the gist of the present disclosure.

This application provides an ultra-high frequency RFID tag quantity estimation method (estimation method) based on high-dimensional space. This estimation method applies a spatial diversity gain existing in a multi-antenna system. Signals received by multiple antennas are re-arranged to high-dimensional vectors. Therefore, a tag quantity estimation problem is modeled as a data clustering problem in high-dimensional space. In this way, overlapped cluster data in low-dimensional space can be separated in the high-dimensional space, thereby improving the accuracy of tag quantity estimation. Compared with the typical solution to estimating the quantity of tags under a multi-antenna system first perform the antenna selection algorithm to obtain higher signal-to-noise ratios, and then estimate the quantity of tags using the SSDA algorithm or Histogram algorithm, this estimation method signals received by multiple antennas avoid discard useful information. Numerical simulations based on MATLAB demonstrate that the proposed method has great advantages over the existing tag quantity estimation method.

The tag quantity estimation method proposed in this application is described below with reference to the accompanying drawings.

Figure 1:
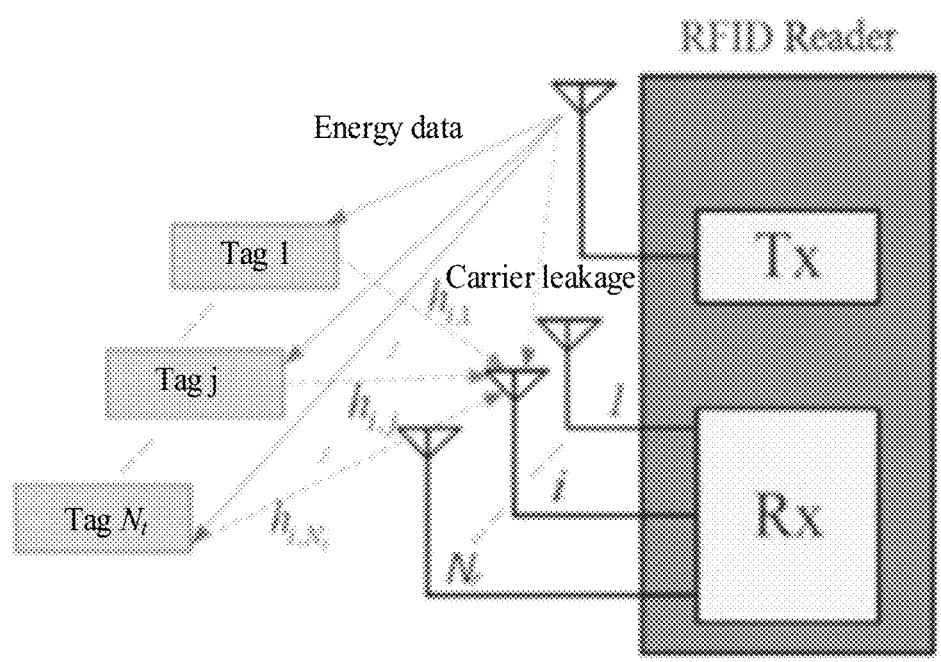
FIG. 1 is a schematic diagram of a multi-antenna ultra-high frequency RFID system with one transmitting antenna and multiple receiving antennas according to an embodiment of this application.

FIG. 1 shows a multi-antenna ultra-high frequency RFID system with one transmitting antenna and multiple receiving antennas according to an embodiment of this application. The system includes one card reader and $N_t$ tags, where the card reader is equipped with one transmitting antenna and $N_r$ receiving antennas.

Figure 2:
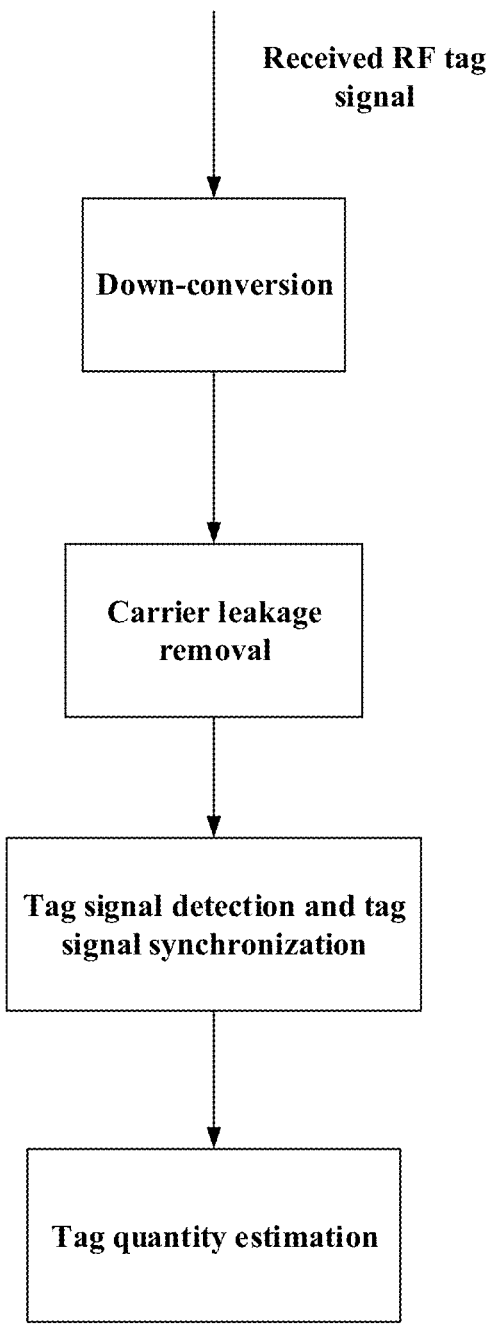
FIG. 2 is a signal processing flow block diagram o of an "ultra-high frequency RFID tag quantity estimation method based on high-dimensional space" according to an embodiment of this application.

FIG. 2 is a systematic block diagram of an ultra-high frequency RFID tag quantity estimation method based on high-dimensional space.

The RFID tag quantity estimation system includes:
a radio frequency signal down-conversion module for down-converting RF signals received by the receiving antenna to the baseband;
a carrier offset module for offsetting the carrier signal in the received signal which is sent by the transmitting antenna; and
a tag quantity estimation module for estimating the quantity of tags, for example, execute the DBSCAN algorithm to perform cluster classification on samples when it is determined that the quantity of tags is not 0, collect statistics on a quantity C of clusters after classification, and calculate a quantity $N_t$ of tags.

When the RFID tag quantity estimation system runs, the tag quantity estimation method (sometimes also referred to as a restoration method) includes:
Step S0: Obtain multiple information blocks of multiple tag signal responses as data for tag quantity estimation. Then, perform step S1.
Step S1: Down-converting the received RF signals to the baseband. Then, perform step S2.
Step S2: Digitalize the baseband signal, and estimate and remove the carrier components in the digitalized baseband signal. Then, perform step S3.
Step S3: Determine whether the quantity of tags is 0; and if yes, return to step S0; or
if not, perform step S31, where
$s_k(n)=[s_{1,k}(n), s_{2,k}(n), \ldots, s_{N_r,k}(n)]^T$, denoting a vector of a $k^{th}$ tag symbol that is received by multiple antennas and in which the carrier signal is removed. The real part and the imaginary part of $s_k(n)$ are separately extracted. The real part and the imaginary part of the signal sequentially stacked, $$\bar{s}_k(n) = \begin{bmatrix} \Re\{s_k(n)\} \\ \Im\{s_k(n)\} \end{bmatrix},$$

denoting a stacked signal vector, where $\Re\{\bullet\}$ denotes the operation of obtaining real part of a complex number, and $\Im\{\bullet\}$ denotes the operation of obtaining imaginary part of a complex number,
$S=\{\bar{s}_1(n), \bar{s}_2(n), \ldots, \bar{s}_K(n)\}$, denoting set of signal sample consisting multiple received tag symbols, where $N_r$ denotes the quantity of receive antennas, $N_0$ denotes the thermal noise energy, $P_0$ denotes a probability specified by a user, $\varepsilon$ and M denote a distance parameter and a density parameter respectively in the density-based spatial clustering of applications with noise (DB-SCAN) algorithm. In this implementation, M=4 and $P_0$=0.9, and the distance parameter $\varepsilon$ in the DBSCAN algorithm is calculated through $N_r$, $N_0$, and $P_0$, where a calculation formula is as follows:

$$\varepsilon=2\sqrt{N_0\gamma^{-1}[\Gamma(N_r),P_0]}; \text{ where}$$

$\gamma^{-1}(m,n)$ is an inverse function of an incomplete gamma function $\gamma(m,n)=\int_0^n t^{m-1}e^{-t}dt$, and $\Gamma(a)=\int_0^\infty t^{1}-e^{-t}dt$ is a standard gamma function. In this implementation, M=4 and $P_0$=0.9, and M is a threshold. When M is greater than this value, an algorithm procedure is triggered. In other implementations, there is no restriction (for example, M is a natural number between 1 and 100, and $P_0$ is any number between 0 and 1.0).

The distance parameter and the density parameter in the DBSCAN algorithm are denoted as $\varepsilon$ and M respectively. The DB SCAN algorithm is executed to perform cluster classification on the samples in S. Statistics on the quantity C of clusters after the classification, and a quantity $N_t$ of tags is calculated, where a calculation method is as follows:

$$N_t=\lceil \log_2 C \rceil; \text{ where}$$

$\lceil \bullet \rceil$ denotes rounding up. In this way, S, $N_0$, $N_r$, $P_0$, and M are inputted and the DBSCAN algorithm is executed, to calculate and output the quantity $N_t$ of tags.

Figure 4:
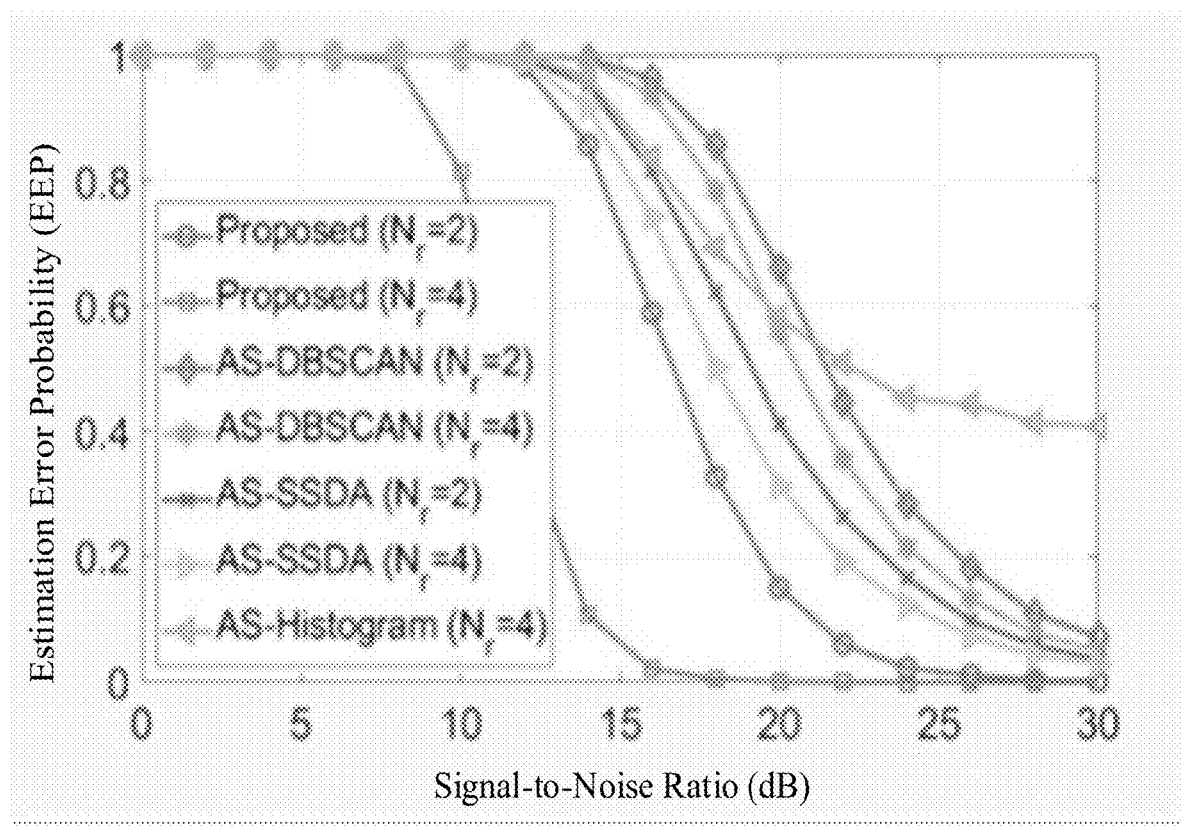
FIG. 4 is a simulation schematic diagram of comparison between a method in an embodiment of this application and an existing method.

FIG. 4 is a simulation schematic diagram of comparison between an implementation of this application and an existing method. FIG. 4 shows estimation error probabilities (Estimation Error Probability, EEP) of a quantity of tags in the method (Proposed) proposed in this application, an antenna-selection-based DBSCAN method (AS-DBSCAN), an antenna-selection-based SSDA method (AS-SSDA), and an antenna-selection-based histogram method (AS-Histogram) in cases of different antenna quantities and different signal-to-noise ratios (SNR).

In the simulation environment of FIG. 4, the RFID system used conforms to the ISO18000-6C protocol standard. The quantity $N_r$ of the receiving antennas is 2 and 4, and the quantity of tags is 3. It is assumed that a channel between each tag and the reader is an independent and identically distributed quasi-static Rayleigh fading channel. Estimation error probabilities (EEP) of the method proposed in this application are compared with those of the tag quantity estimation algorithms of AS-DB SCAN, AS-SSDA, and AS-Histogram in cases of different signal-to-noise ratios (SNR) and different antenna quantities. As can be seen from FIG. 4, the tag quantity estimation algorithm proposed in this application has a lower estimation error probability than the AS-DB SCAN, AS-SSDA, and AS-Histogram methods, and has more obvious performance advantages when the quantity $N_t$ of antennas increases from 2 to 4.

Figure 3:
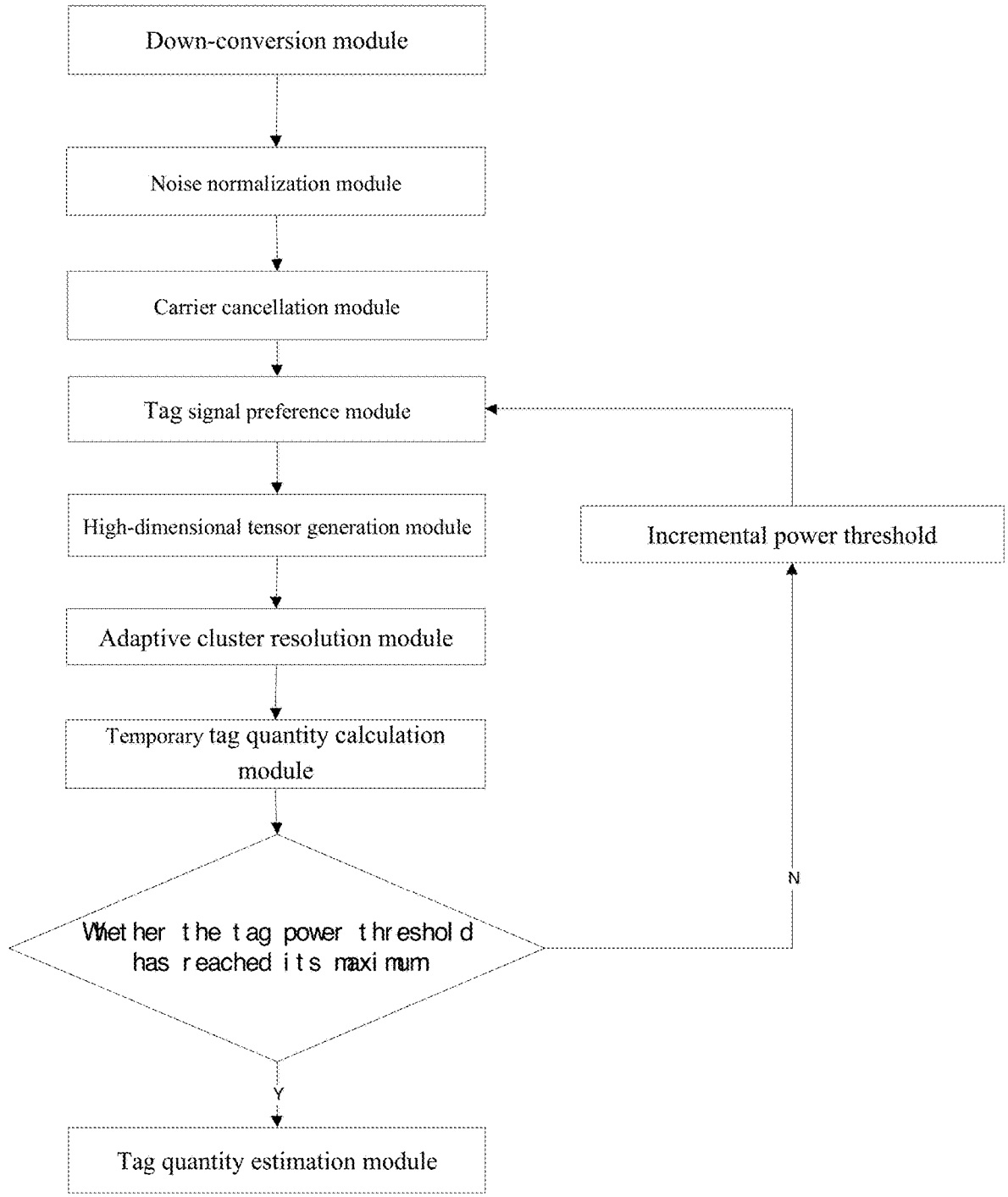
FIG. 3 is a signal processing flow block diagram o of an "ultra-high frequency RFID tag quantity estimation method based on high-dimensional space" according to an embodiment of this application.

FIG. 1 shows a multi-antenna ultra-high frequency RFID system with one transmitting antenna and multiple receiving antennas according to an embodiment of this application. The system includes one card reader and $N_t$ tags, where the card reader is equipped with one transmitting antenna and $N_r$ receiving antennas. FIG. 3 is a systematic block diagram of an ultra-high frequency RFID tag quantity estimation method based on high-dimensional space When the RFID tag quantity estimation system runs, the tag quantity estimation method (sometimes also referred to as a restoration method) includes:
Step S00: obtaining multiple information blocks of multiple tag signal responses as reference data for tag quantity estimation. In this step, Each receiving antenna on the reader receives RF signals reflected from multiple RFID tags to the reader at the same time. assuming that the number of receiving antennas is $N_r$, then you can get $N_r$ Road(channel) RF signals. In an implementations, each antenna receives RF signals reflected from multiple RF tags to the reader.

Step S10, converting the received RF signals to baseband based on the down-conversion module. In this step, without loss of generality, we assume that the baseband signal length is L.

Step S20, removing the carrier components based on a carrier cancellation module (also known as carrier offset module) to obtain a digitized baseband signal and denoting the baseband signal by complex number. The removed digital signal has orthogonal and in-phase components, which need to be expressed in complex numbers. The module will end up with a $N_r$path(channel) complex baseband signal of length L.

Step S30, estimating the observed noise power in the complex baseband signal with the carrier component removed and normalize the estimate by the noise normalization module. In this step, estimate the observed noise power in all $N_r$road(channel) complex baseband signals, normalize the results based on the estimation, so that the noise power of each road (channel) is normalized to 1. remark the maximum power of the tags in the road (channel) signals obtained after normalization as $P_m$ (the maximum power of all tags signals as $P_m$), and initialize the tags power threshold $P_t=1$.

Step S40, put the normalized complex number baseband signals through tag signal preference module, the tag signal preference module being preset with a tag power threshold, selecting baseband signals that are greater than the label power threshold, put the $N_r$ road (channel) complex baseband signals obtained in S30 through Tag Signal Preference Module, select $N_s$ road baseband signal outputs and input to the label number estimation module. In this step, the selection method is to select the $N_s$road complex baseband signals that are larger than the threshold $P_t$ for output according to a preset label power threshold, wherein the initial value of the power threshold is $[1, P_m]$.

Step S50, put the selected complex baseband signals into high-dimensional tensor generation module, wherein its real part and imaginary part are taken for the complex baseband signals respectively, and the dimension of the tensor generated by the high-dimensional tensor generation module is two times the quantity of the input. In this step, for the $N_s$ road baseband signal obtained after tag signal preference, its real part and imaginary part are taken respectively and input to the high dimensional tensor (Tensor) generation module. In the tensor generated by this module has $2N_s$ dimension. For a baseband signal of length L, then L tensors of dimension $2N_s$ are generated.

Step S60, calculating the quantity of high-dimensional clusters formed by the high-dimensional tensor based on adaptive clustering discrimination module. The quantity of high-dimensional clusters formed by a tensor of dimension is calculated by the adaptive clustering discrimination module, and adaptive clustering algorithms that can be employed include, but are not limited to, DBSCAN and OPTICS, among others. In this step, the key input parameter in the adaptive clustering resolution module, clustering radius (clustering radius) ε, can be selected by referring to the following equation: $\varepsilon = 2\sqrt{\gamma^{-1}[\Gamma(N_r), P_0]}$; wherein $\gamma^{-1}(m,n)$ is an inverse function of an incomplete gamma function $\gamma(m,n) = \int_0^n t^{m-1} e^{-t} dt$, $\Gamma(a) = \int_0^\infty t^{a-1} e^{-t} dt$ is a standard gamma function, $P_0$ denotes a confidence probability specified by a user, $N_r$ denotes a quantity of receive antennas.

Step S70, put the quantity of high-dimensional clusters obtained by the adaptive cluster resolution module into temporary tag count module and record the output of the tag count module as the result of the temporary tag count calculation. The quantity of clusters obtained from the output of the cluster discrimination module is input to the label quantity calculation module, the output of the module is recorded as the result of one label quantity calculation, and the calculation is completed and returned to step S40. Assuming that the quantity of clusters obtained in step S70 is C, the resulting quantity of labels $N_t$ may be calculated with reference to the following formula: $N_t = \lceil \log_2 C \rceil$.

Step S80, if the current tag power threshold reaches the maximum power of the tag, go to step S90, If not, the power threshold is adjusted upward and proceeds to step S40. In an implementations, you can divide $[1, P_m]$ into 100 cells (or any other quantity of servings, without limitation herein) and then increase the power one cell (or any other quantity of servings, without limitation herein) at a time.

Step S90: for under the tag power threshold condition, all temporary tags quantity calculation results recorded in step S80 are passed through the tag quantity estimation module to obtain final tag quantity. final estimate of the quantity of tags is obtained by the tag quantity estimation module for all tag quantity calculation results recorded in step S80 under the tag power threshold condition. In this step the estimation process is to count the results of the calculation of the quantity of tags recorded in step S80 under different tag power threshold conditions using a histogram, and select the quantity of tags whose frequency of occurrence is the highest as the estimation result.

An RFID tag quantity estimation system comprises:

a down-conversion module for down-converting RF signals received by the receiving antenna to the baseband;

a carrier cancellation module for remove carrier component in the received signal which is sent by the transmitting antenna;

a noise normalization module for normalize the complex baseband signal with the carrier component removed;

a tag signal preference module being preset with tag power threshold for selecting baseband signals that are greater than the label power threshold;

a high-dimensional tensor generation module for the generate tensor dimension is greater than the quantity of input (The high-dimensional tensor generation module for the generate tensor dimension is two times the quantity of input), the generate tensor dimension receive the selected complex baseband signals, and then the complex baseband signals's real part and imaginary part are respectively, for generate high-dimensional signals;

a adaptive clustering discrimination module for calculating the quantity of high-dimensional clusters formed by the high-dimensional tensor;

a temporary tag count module for recording the output of tags, and a tag quantity estimation module for estimating the quantity of tags. In this way, overlapped cluster data in low-dimensional space can be separated in the high-dimensional space, thereby improving the accuracy of tag quantity estimation.

This application also provides a processor-readable medium comprising a computer program running the above-described estimation method.

A person of ordinary skill in the art can understand that all or some of the steps in the foregoing method may be accomplished by hardware related to program instructions. The aforementioned program can be stored in a computer (processor)-readable storage medium. When the program is executed, the steps in the foregoing method embodiments are performed. The foregoing storage medium includes: various media that can store program code such as a ROM, a RAM, a magnetic disk, or an optical disk.

The technical features of the above embodiments may be performed in any combination. For ease of description, not all possible combinations of various technical features in the foregoing embodiments are described. However, as long as the combination of these technical features is not contradictory, they should be considered the scope described in this specification.

The foregoing embodiments are only to illustrate the technical ideas and features of this application, aiming to enable person familiar with this technology to understand the content of this application. The protection scope of this application is not limited thereto. All equivalent transformations or modifications made without departing from the spirit of this application should fall within the protection scope of this application.

What is claimed is:

1. A method for estimating the quantity of RFID tags using an estimation system comprises;
   a transmitting antenna for transmitting RFID reader signals with carrier component;
   multiple receiving antennas for receiving RF tag signals;
   a down-conversion module for down-converting the RF tag signals received by the receiving antennas to baseband signals;
   a carrier cancellation module for removing the carrier component from the received RF tag signals; and
   a tag quantity estimation module for estimating the quantity of tags;
   wherein the method comprises the following steps:
   S00: obtaining multiple information blocks of the RE tag signals as reference data for the RFID tag quantity estimation;
   S10: converting the received RF tag signals to baseband signals based on the down-conversion module;
   S20: removing the carrier components based on the carrier cancellation module to obtain a digitized baseband signal and denoting the baseband signal by complex number;
   S30: estimating the observed noise power in the complex baseband signal with the carrier component removed and normalize the estimate by noise normalization module;
   S40: processing the normalized complex baseband signals through tag signal preference module, the tag signal preference module being preset with a tag power threshold, selecting baseband signals that are greater than the preset power threshold;
   S50: processing the selected complex baseband signals into high-dimensional tensor generation module, wherein real part and imaginary part are taken for the complex baseband signals respectively, and the dimension of the tensor generated by the high-dimensional tensor generation module is two times the quantity of the input;
   S60: calculating the quantity of high-dimensional clusters formed by the high-dimensional tensor based on adaptive clustering discrimination module;
   S70: process the quantity of high-dimensional clusters obtained by the adaptive cluster resolution module into temporary tag count module and record the output of the temporary tag count module as the result of temporary tag count calculation;
   S80: if current tag power threshold reaches a maximum power of the tag, all temporary tags quantity calculation results recorded are passed through the tag quantity estimation module to obtain final tags quantity;
   S90: if the current tag power threshold does not reach the maximum power of the tag, the power threshold is adjusted upward and proceeds to step S40.

2. The estimation method according to claim 1, wherein the S30 includes making normalize the noise power of each channel to 1, note that the maximum power of the tag in the resulting channel signal after normalization is $P_m$, and initialize the tag power threshold $P_t=1$.

3. The estimation method according to claim 1, wherein the tag power threshold is between $[1, P_m]$.

4. The estimation method according to claim 1, wherein the digitized baseband signal comprises orthogonal and in-phase components.

5. The estimation method according to claim 1, wherein the baseband signals of $N_s$ channels larger than the preset tag power threshold are selected and input into the tag quantity estimation module, and the tensor generated by the high-dimensional tensor generation module has a dimension of $2N_s$.

6. The estimation method according to claim 1, wherein, the final quantity of tags is obtained by the following formula:

$$N_t = \lceil \log_2 C \rceil,$$

wherein C is the quantity clusters after the classification.

7. The estimation method according to claim 1, wherein the results of calculating the quantity of all temporary tags recorded in step S80 are counted using a bar chart, and the quantity of tags whose frequency of occurrence is the highest is selected as the estimation result.

* * * * *